United States Patent
Sasaki et al.

(10) Patent No.: US 7,981,395 B2
(45) Date of Patent: Jul. 19, 2011

(54) NEGATIVE ELECTRODE CARBON MATERIAL FOR LITHIUM ION SECONDARY BATTERY AND MANUFACTURING METHOD THEREOF

(75) Inventors: Shoji Sasaki, Aomori (JP); Tsuyoshi Temma, Aomori (JP); Munehiro Kadowaki, Tokyo (JP); Hironori Ozawa, Tokyo (JP); Kazunori Ozawa, Tokyo (JP); Syujun Shikano, Yamagata (JP); Kanji Matsuda, Yamagata (JP)

(73) Assignee: Enax, Inc., Tokyo (JP)

(*) Notice: Subject to any disclaimer, the term of this patent is extended or adjusted under 35 U.S.C. 154(b) by 1590 days.

(21) Appl. No.: 11/330,395

(22) Filed: Jan. 12, 2006

(65) Prior Publication Data

US 2007/0160909 A1 Jul. 12, 2007

(51) Int. Cl.
- H01M 4/13 (2010.01)
- H01M 4/02 (2006.01)
- H01M 4/62 (2006.01)
- H01M 4/58 (2010.01)
- H01M 4/60 (2006.01)
- C09C 1/56 (2006.01)
- C01B 31/00 (2006.01)
- C01B 31/02 (2006.01)

(52) U.S. Cl. .......... 423/445 R; 423/460; 429/212; 429/231.4; 429/209; 429/213; 429/231.8; 429/231.9; 429/218

(58) Field of Classification Search .......... None
See application file for complete search history.

(56) References Cited

U.S. PATENT DOCUMENTS

| | | | |
|---|---|---|---|
| 4,466,932 A * | 8/1984 | Koyama et al. | 264/29.3 |
| 5,733,829 A * | 3/1998 | Tange et al. | 501/95.1 |
| 5,834,138 A * | 11/1998 | Yamada et al. | 429/326 |
| 5,972,536 A * | 10/1999 | Yamada et al. | 429/231.4 |
| 6,335,122 B1 * | 1/2002 | Yamada et al. | 429/231.4 |
| 2001/0033971 A1 * | 10/2001 | Zhao et al. | 429/231.8 |
| 2007/0189986 A1 * | 8/2007 | Wang et al. | 424/59 |
| 2009/0208780 A1 * | 8/2009 | Sun et al. | 429/12 |

FOREIGN PATENT DOCUMENTS

| JP | 2001-266850 | 9/2001 |
|---|---|---|
| JP | 2004-210464 A | 7/2004 |
| JP | 2006-032091 A | 2/2006 |

OTHER PUBLICATIONS

European Search Report for European Application No. 06250214, mailed May 21, 2007.

* cited by examiner

*Primary Examiner* — Melvin C Mayes
*Assistant Examiner* — Guinever S Gregorio
(74) *Attorney, Agent, or Firm* — Edwards Angell Palmer & Dodge LLP

(57) ABSTRACT

A negative electrode carbon material for a lithium ion secondary battery manufactured by calcinating a rice starch portion obtained by removing the pericarp and tests from unpolished rice and a method for manufacturing the same. The rice starch portion is preferably middle-grade white bran or high-grade white bran each obtained when unpolished rice is polished. The above negative electrode carbon material may have a relatively broad peak at a $2\theta$ of 40 to 50° and a sharp peak at a $2\theta$ of 42 to 44° in its powder X-ray (CuK$\alpha$) diffraction. According to the present invention, a negative electrode carbon material for a lithium ion secondary battery which has the same quality as the prior art product can be manufactured at a low cost by making effective use of middle-grade white bran or high-grade white bran of rice.

17 Claims, 2 Drawing Sheets

NEGATIVE ELECTRODE CARBON MATERIAL FOR LITHIUM ION SECONDARY BATTERY AND MANUFACTURING METHOD THEREOF

BACKGROUND OF THE INVENTION

1. Field of the Invention

The present invention relates to a negative electrode carbon material for a lithium ion secondary battery and to a manufacturing method thereof. More specifically, the present invention relates to a negative electrode carbon material for a lithium ion secondary battery which is manufactured from a rice starch portion as a raw material and has an excellent effect on reducing the raw material cost, and relates to a manufacturing method thereof.

In the present invention, the term "rice starch portion" indicates a starch portion derived from rice which is called "middle-grade white bran" or "high-grade white bran" and an albumen portion containing a large amount of starch particles.

2. Description of the Related Art

JP-A-2001-266,850 discloses a technology in which rice bran is used as a raw material for a negative electrode carbon material for a lithium ion secondary battery. In this invention, the lees of rice bran obtained after oil is extracted from the rice bran, that is, the pericarp and testa in the rice bran, commonly called "red bran", are used as a raw material and mixed with a thermosetting resin such as a phenolic resin, and the mixture is calcinated to thereby manufacture a carbon material for a negative electrode.

However, in the invention disclosed by this publication, as described in examples, the step for extracting oil from rice bran is indispensable. Without it, a large amount of volatile matter other than water floats at the time of calcinating, adheres to the inside wall of a furnace, and generates a bad smell, thus making the method impractical. In addition, the maintenance of an electric furnace after calcinating is necessary and the cost for this is indispensable. Further, a thermosetting resin such as a phenolic resin which is used in combination with rice bran is more expensive than rice bran. As a result, the merit of reducing the cost by using rice bran as one of the vegetable residues cannot be enjoyed.

Unhulled rice is the seed of a rice plant, and unpolished rice is obtained by removing the hull of this unhulled rice. The unpolished rice is composed of the pericarp, testa, embryo, and albumen, and the albumen is composed of an outer aleurone layer and an inner layer of a starch storing tissue. The pericarp and the testa are also called "red bran". As for the mass of each tissue of the unpolished rice, from the exterior side, the red bran accounts for 5 to 7%, the embryo accounts for 2 to 3%, and the albumen accounts for 90 to 93% of the total.

The surface layer of the unpolished rice having a polished rice percentage L of 100 to 91% may be called "red bran layer", the exterior portion of the albumen having a polished rice percentage L of 91 to 81% may be called "sapio layer", and the interior portion of the albumen having a polished rice percentage L of 81 to 66% may be called "white bran layer".

In general, in the process for polishing unpolished rice, the degree of polishing rice can be expressed by polished rice percentage L. The polished rice percentage L herein refers to the percentage of the mass of polished rice to the mass of unpolished rice as shown by the following expression 1.

$$\text{Polished rice percentage } L \text{ (\%)} = (\text{mass of polished rice} \div \text{mass of unpolished rice}) \times 100 \quad (1)$$

The polishing percentage refers to the percentage of the mass of grounds to the mass of unpolished rice as expressed by the following expression 2.

$$\text{Polishing percentage (\%)} = (\text{mass of grounds} \div \text{mass of unpolished rice}) \times 100 \quad (2)$$

Further, the mass of unpolished rice is the total of the mass of polished rice and the mass of grounds as expressed by the following expression 3.

$$\text{Mass of polished rice} + \text{mass of grounds} = \text{mass of unpolished rice} \quad (3)$$

Therefore, the following relational expression (4) is always established for the degree of polishing rice.

$$\text{Polished rice percentage } L \text{ (\%)} + \text{polishing percentage (\%)} = 100 \text{ (\%)} \quad (4)$$

The polished rice percentage L of rice to be eaten as cooked rice is generally about 92 to 90%. Polished rice having a polished rice percentage L of 70 to 50% is generally used for the brewing of sake, and the quality of sake is generally improved by reducing the polished rice percentage L. A portion having a polished rice percentage L of 90 to 70% (polishing percentage of 10 to 30%) is called "middle-grade white bran", and a portion having a polished rice percentage L of 70 to 50% (polishing percentage of 30 to 50%) is called "high-grade white bran".

As for the above rice bran, the middle-grade white bran and the high-grade white bran are used as fodder and raw materials for confectionery. The development of new applications is desired for the effective use of the rice bran.

SUMMARY OF THE INVENTION

In view of the above problems of the prior art, the inventors of the present invention have conducted intensive studies on a negative electrode carbon material for a lithium ion secondary battery which is free from problems such as a bad smell at the time of calcinating and the maintenance of an electric furnace, can be produced at a low cost, and has the same or higher performance than that of the prior art products, and a manufacturing method thereof. They have found that the above objects can be attained by obtaining a rice starch portion from unpolished rice and calcinating it, thus accomplished the present invention.

It is therefore an object of the present invention to provide a negative electrode carbon material for a lithium ion secondary battery which is free from problems such as a bad smell at the time of calcinating and the maintenance of an electric furnace and has the same or higher performance than that of the prior art products.

It is another object of the present invention to provide a method for manufacturing a negative electrode carbon material for a lithium ion secondary battery which is capable of manufacturing the above negative electrode carbon material for a lithium ion secondary battery at a low cost.

That is, the present invention provides a negative electrode carbon material for a lithium ion secondary battery which is manufactured by calcinating a rice starch portion obtained by removing the pericarp and testa from unpolished rice.

Further, the present invention provides a method for manufacturing a negative electrode carbon material for a lithium ion secondary battery, including a first step for obtaining a rice starch portion by removing the pericarp and testa from unpolished rice and a second step for calcinating the rice starch portion.

In the starch storing tissue of the albumen which is a starch portion derived from rice, in general, one amyloplast is densely filled with 50 to 80 starch particles. As for the size of each starch particle of rice, the diameter of the starch particle is about 6 to 10 μm for a relatively large amyloplast having a long diameter of about 40 μm and about 1 μm for a relatively small amyloplast. In other word, the starch particle of rice is generally as large as 10 μm or less and much smaller than starches derived from other plants. Therefore, by calcinating the starch particles of rice, carbon particles having a small primary particle diameter and a large specific surface area can be obtained and a carbon material suitable for the manufacture of a negative electrode for lithium ion secondary batteries can be manufactured.

Preferably, the rice starch portion used in the present invention is middle-grade white bran or high-grade white bran obtained by polishing unpolished rice, and the negative electrode carbon material of the present invention has a relatively broad peak at a 2θ of 40 to 50° and a sharp peak at a 2θ of 42 to 44° in its powder X-ray (CuKα) diffraction diagram. When it has a sharp peak at a 2θ of 42 to 44° and this negative electrode carbon material is used to manufacture a lithium ion secondary battery, initial charge/discharge efficiency is improved and the resulting negative electrode shows excellent performance. To distinguish the sharp peak exists at a 2θ of 42 to 44° from noise easily, the A/B ratio of the intensity A of the sharp peak at a 2θ of 42 to 44° to the intensity B of the relatively broad peak at a 2θ of 40 to 50° is preferably 1.2 or more, more preferably 1.4 or more. The half-value width of the above relatively broad peak is preferably 3.5 to 5.5° and the half-value width of the sharp peak is preferably 0.30 to 0.45°.

The negative electrode carbon material for a lithium ion secondary battery of the present invention is formed from a starch portion composed of starch particles smaller than starch particles derived from other plants. Fine particles constituting the negative electrode carbon material for a lithium ion secondary battery can be made finer even after they are calcinated, thereby making it possible to shorten the distance between particles and make the microstructure finer. Therefore, the microstructure forms a plane (110) and the sharp peak at 42 to 44°. If the fine particles after calcinating can be made finer and the distance between particles can be made short to form a fine structure such as a network structure like hard carbon, a negative electrode for lithium ion secondary batteries can be manufactured from a thinner carbon material. When compared with a negative electrode of the same volume, the number of network structures increases and the capacity of a space which lithium ions easily enter increases owing to the fine microstructure of the carbon material, thus a large capacity can be expected.

Since a portion containing a large amount of starch particles is used in the negative electrode carbon material for a lithium ion secondary battery of the present invention, as compared with a carbon material obtained by adding a phenolic resin to red bran and calcinating the mixture, the structure after calcinating is fine and the battery characteristics are improved. The negative electrode carbon material of the present invention is advantageous in terms of production cost over a carbon material manufactured from petroleum pitch.

The method for manufacturing a negative electrode carbon material for a lithium ion secondary battery of the present invention includes a first step for obtaining a rice starch portion by removing the pericarp and the testa from unpolished rice and a second step for calcinating the rice starch portion. Since the pericarp and the testa are removed in the first step, the rice starch portion to be calcinated in the second step does not contain oil, thus a large amount of volatile matter does not float at the time of calcinating. As for the first step for obtaining the rice starch portion, rice bran collected in a step for polishing rice for the manufacture of sake is simply divided into a portion consisting of the pericarp and the testa and the other rice starch portion, thereby making possible the acquisition of a rice starch portion as the by-produced middle-grade white bran or high-grade white bran. Thereby, the raw material cost can be significantly cut. In the above second step, the rice starch portion is calcinated to obtain a negative electrode carbon material for a lithium ion secondary battery having a fine network structure with excellent lithium ion holding properties. The calcinating of the second step can be carried out in an inert gas atmosphere such as nitrogen gas or argon gas.

The first step preferably includes a sub-step for removing an aleurone layer after the pericarp and the testa is removed from the unpolished rice. The middle-grade white bran contains a partial aleurone layer and an albumen. The high-grade white bran composed of an albumen alone is preferred because the structure of the negative electrode carbon material obtained after calcinating is uniform and fine. However, the cost for acquiring the high-grade white bran is higher than that of the middle-grade white bran, and whether the middle-grade white bran or the high-grade white bran should be used as a raw material or a mixture thereof should be used depends on balance between the cost and the obtained structure.

Further, the first step is a step for acquiring a rice starch portion corresponding to middle-grade white bran or high-grade white bran obtained when unpolished rice is polished. The second step preferably includes a sub-step for calcinating the rice starch portion corresponding to the middle-grade white bran or high-grade white bran. In this case, the rice starch portion is powdery. The first step can be a step for acquiring a powdery rice starch portion by removing the pericarp and the testa from the unpolished rice. Further, this powdery rice starch portion is molded into a pellet, and the pellet rice starch portion is calcinated. Thus, it is possible to bake the rice starch portion uniformly in a short period of time.

In the method for manufacturing the negative electrode carbon material for a lithium ion secondary battery of the present invention, it is preferable to: acquire a rice starch portion having a polishing percentage of 7% or more to 65% or less by removing the pericarp and the testa corresponding at least to a polishing percentage of less than 7% (polished rice percentage of more than 93%) in the first step; and bake the rice starch portion in the second step. It is more preferable to: acquire a rice starch portion corresponding to a polishing percentage of 9% or more to 65% or less by removing the pericarp and the testa corresponding at least to a polishing percentage of less than 9% (polished rice percentage of more than 91%) in the first step; and bake the rice starch portion in the second step.

Further, in the method for manufacturing the negative electrode carbon material for a lithium ion secondary battery of the present invention, it is particularly preferable to: acquire a rice starch portion corresponding to a polishing percentage of 12% or more to 65% or less by removing the pericarp, testa and aleurone layer corresponding at least to a polishing percentage of less than 12% (polished rice percentage of more than 88%) in the first step; and bake the rice starch portion in the second step.

The lower limit of polishing percentage of the obtained rice starch portion needs to be at least 7% to remove the pericarp and the testa from the unpolished rice, preferably 9% or more to remove the pericarp and the testa from the unpolished rice more completely, particularly preferably 12% or more to obtain a uniform and fine structure of a carbide obtained by removing the aleurone layer. The upper limit of polishing percentage of the obtained rice starch portion is preferably 65% or less because when the polishing percentage is higher than 65%, rice is broken, more preferably 60% or less to obtain the rice starch portion at a low cost, particularly preferably 55% or less.

In the method for manufacturing the negative electrode carbon material for a lithium ion secondary battery of the present invention, the first step is preferably a step for acquiring bran by-produced in a rice polishing step for the manufacture of sake. When rice is polished up to a polished rice percentage of 35%, a rice starch portion having a polishing percentage of 65% or less can be used as a raw material to be calcinated in the second step. When rice is polished up to a polished rice percentage of 40%, a rice starch portion having a polishing percentage of 60% or less can be used as a raw material to be calcinated in the second step. When rice is polished up to a polished rice percentage of 50%, a rice starch portion having a polishing percentage of 50% or less can be used as a raw material to be calcinated in the second step. When rice is polished up to a polished rice percentage of 65%, a rice starch portion having a polishing percentage of 35% or less can be used as raw material to be calcinated in the second step.

In the method for manufacturing the negative electrode carbon material for a lithium ion secondary battery of the present invention, the second step preferably includes: a sub-step for precalcinating the rice starch portion to thereby obtain a precalcinated product; a sub-step for grinding the precalcinated product into a ground product; and a sub-step for post-calcinating the ground product at a temperature higher than the temperature of the precalcinating step. The rice starch portion can be uniformly calcinated by performing the second step in such a manner, therefore a negative electrode carbon material for a lithium ion secondary battery having excellent powder characteristics can be obtained. In the grinding sub-step, the precalcinated product is ground into particles each having an average diameter of, for example, 5 μm or more to 40 μm or less.

In the method for manufacturing the negative electrode carbon material for a lithium ion secondary battery of the present invention, the second step can be, for example, a step for calcinating the rice starch portion at 500 to 2,700° C. for 0.5 to 50 hours. In the second step, the precalcinating sub-step is preferably a sub-step for calcinating the rice starch portion at 500 to 1,000° C. for 0.5 to 10 hours, and the post-calcinating sub-step is preferably a sub-step for calcinating the ground product at 700 to 1,600° C. for 0.5 to 50 hours. The post-calcinating sub-step is more preferably a sub-step for calcinating the ground product at 1,100 to 1,400° C., particularly preferably the sub-step for calcinating the ground product at 1,200 to 1,300° C.

The powder X-ray (CuKα) diffraction diagram of the negative electrode carbon material for a lithium ion secondary battery can have a relatively broader peak at a 2θ of 40 to 50° and a sharper peak at a 2θ of 42 to 44° when the rice starch portion is calcinated at 1,100 to 1,400° C. for 0.5 to 50 hours.

According to the method for manufacturing the negative electrode carbon material for a lithium ion secondary battery of the present invention, working properties are excellent because volatile matters rarely float at the time of calcination as the pericarp and the testa are removed from unpolished rice, and the raw material cost can be cut as a starch portion derived from rice obtained as a by-product in the manufacture of sake is used. Therefore, the working properties and cost can be improved as compared with the prior art in which a mixture of red bran and a phenolic resin is calcinated. The performance of the obtained negative electrode carbon material for a lithium ion secondary battery can be made equal to or higher than that of the prior art because the pericarp portion is removed. Further, the raw material cost can be reduced because a starch portion derived from rice obtained as a by-product in the manufacture of sake is used, and volatile matters rarely float at the time of calcinating because the testa is removed from unpolished rice. Therefore, working properties are excellent and the total production cost of the negative electrode carbon material for a lithium ion secondary battery can be greatly cut.

Further, as a rice starch portion having relatively small starch particles is used in the method for manufacturing the negative electrode carbon material for a lithium ion secondary battery of the present invention, the micro-structure of the negative electrode carbon material for a lithium ion secondary battery can be made finer after calcinating compared with a negative electrode carbon material for a lithium ion secondary battery obtained by calcinating a starch portion derived from other plant, thereby making it possible to form a thinner and smaller negative electrode for secondary batteries. As a result, the charge/discharge capacity per unit volume can be increased.

A red bran portion out of rice bran is apt to change in composition depending on the producing district of the used unpolished rice, climate changes, the harvest time, etc., and the quality control of the obtained negative electrode carbon material for a lithium ion secondary battery is difficult. In contrast to this, a component derived from a raw material rarely changes and quality control is easy because a red bran portion out of rice bran is removed in the method for manufacturing the negative electrode carbon material for a lithium ion secondary battery of the present invention.

DETAILED DESCRIPTION OF THE INVENTION

Embodiments of the present invention will be described hereinafter.

Examples 1 to 13

(Step for Acquiring a Rice Starch Portion)

600 kg of unpolished rice was polished for 28 hours with a rice polishing machine for brewing (HS-15 CNC of Chiyoda Co., Ltd.) to obtain polished rice for sake having a polished rice percentage L of 50%. At this point, about 60 kg of a rice starch portion corresponding to middle-grade white bran (L=85 to 75%, polishing percentage of 15 to 25%) was obtained by removing a red bran layer (L=100 to 91%) and a sapio layer (L=91 to 85%) (Examples 1 and 2). Similarly, a powdery rice starch portion corresponding to middle-grade white bran (L=80 to 70%, polishing percentage of 20 to 30%) was obtained by removing a red bran layer and a sapio layer (L=100 to 80%) (Example 3). A powdery rice starch portion corresponding to middle-grade white bran (L=90 to 70%, polishing percentage of 10 to 30%) was obtained by removing a red bran layer and a sapio layer (L=100 to 90%) (Examples 4 to 9). Similarly, a powdery rice starch portion corresponding to high-grade white bran (L=65 to 50%, polishing percentage of 35 to 50%) was obtained (Examples 10 and 11). Powdery rice starch portions each corresponding to middle-grade white bran and high-grade white bran (L=85 to 50%, polishing percentage of 15 to 50%) was obtained (Examples 12 and 13). About 5 mass % of water was sprayed over each of the rice starch portions. Then, each of the mixtures was mixed and stirred, was molded into a pellet having a diameter of 3 mm and a length of 3 mm with a granulating machine (Desk Pelleter, F20/330), and dried at 70 to 80° C. for 5 minutes.

(Baking Step)

Each of the obtained pellet rice starch portions was precalcinated in a rotary kiln in a nitrogen gas atmosphere at 450 to 900° C. for 0.4 to 9 hours. Thereafter, the precalcinated product was ground to obtain a ground product having an average particle diameter of 20 to 30 μm, and this ground product was put into a crucible and post-calcinated at 650 to 2,700° C. for 0.45 to 48 hours to obtain a negative electrode carbon material for a lithium ion secondary battery. Those conditions are shown in Table 1.

Figure 1:
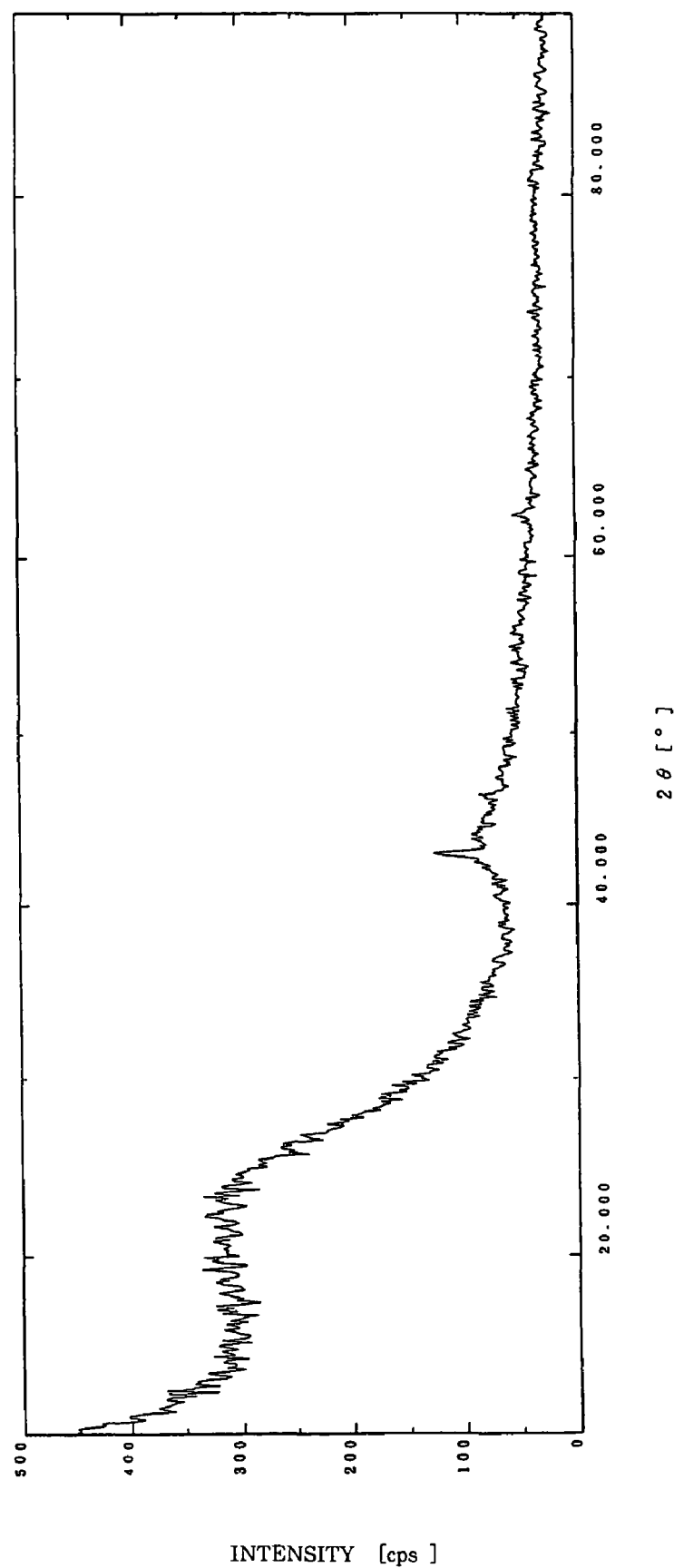
FIG. 1 is an X-ray diffraction diagram of a negative electrode carbon material for a lithium ion secondary battery according to Example 1 of the present invention.

An X-ray diffraction diagram of the negative electrode carbon material for a lithium ion secondary battery (Example 1) obtained by post-calcinating at 1,200° C. for 5 hours out of those is shown in FIG. 1. The X-ray source is CuKα (40 kV, 30 mA), the width of a divergence slit was ½ deg., the width of a scattering slit was ½ deg., and the width of a light receiving slit was 0.15 mm. A Kβ filter was used to measure at a scanning range of 10 to 90°. The horizontal axis of the obtained X-ray diffraction diagram shows 2θ(°) and the vertical axis shows the detected intensity (cps). As a result, the carbon material has a relatively broad peak at a 2θ of 40 to 50° and a sharp peak at a 2θ of 42 to 44°. More specifically, the half-value width of the relatively broad peak at a 2θ of 40 to 50° (peak top is at a 2θ of 44°) was 4.60 and the height of the peak was 24 cps. The half-value width of the sharp peak at a 2θ of 42 to 44° (peak top is at a 2θ of 42.9°) was 0.36° and the height of the peak was 46 cps. The ratio of the intensity of the sharp peak to the intensity of the broad peak was 1.92.

TABLE 1

| Sample No. | Raw material | Polishing percentage of raw material (%) | Precalcinating Temperature (° C.) | Precalcinating Time (h) | Post-calcinating Temperature (° C.) | Post-calcinating Time (h) |
|---|---|---|---|---|---|---|
| Example 1 | Middle-grade white bran | 15-25 | 700 | 5 | 1,200 | 5 |
| Example 2 | Middle-grade white bran | 15-25 | 800 | 8 | 1,300 | 5 |
| Example 3 | Middle-grade white bran | 20-30 | 700 | 5 | 1,200 | 0.6 |
| Example 4 | Middle-grade white bran | 10-30 | 900 | 9 | 1,550 | 5 |
| Example 5 | Middle-grade white bran | 10-30 | 700 | 4 | 1,000 | 5 |
| Example 6 | Middle-grade white bran | 10-30 | 550 | 8 | 750 | 10 |
| Example 7 | Middle-grade white bran | 10-30 | 900 | 1 | 2,700 | 1 |
| Example 8 | Middle-grade white bran | 10-30 | 900 | 1 | 1,650 | 5 |
| Example 9 | Middle-grade white bran | 10-30 | 450 | 0.4 | 650 | 5 |
| Example 10 | High-grade white bran | 35-50 | 800 | 2 | 1,200 | 5 |
| Example 11 | High-grade white bran | 35-50 | 900 | 3 | 1,300 | 0.45 |
| Example 12 | Middle-grade white bran + High-grade white bran | 15-50 | 950 | 1 | 1,300 | 5 |
| Example 13 | Middle-grade white bran + High-grade white bran | 15-50 | 700 | 6 | 1,650 | 1 |
| Comparative Example 1 | 75% of red bran + 25% of phenolic resin | 0.5-6 | 800 | 2 | 900 | 5 |
| Comparative Example 2 | 75% of red bran + 25% of phenolic resin | 0.5-6 | 900 | 1 | 1,300 | 10 |
| Comparative Example 3 | 75% of red bran + 25% of phenolic resin | 0.5-6 | 900 | 1 | 1,550 | 10 |

TABLE 2

| Sample No. | Adhesion of volatile matters during calcinating | Raw material cost | Existence of peak (#1) | Half-value width (*) Broad | Half-value width (*) Sharp | Ratio of peak intensity (#2) | Initial charge capacity (mAh/g) Charge | Initial charge capacity (mAh/g) Discharge | Initial Efficiency (%) | Discharge Performance |
|---|---|---|---|---|---|---|---|---|---|---|
| Example 1 | Small | Inexpensive | Present | 4.6 | 0.36 | 1.92 | 111.4 | 78.3 | 70.3 | ◎ |
| Example 2 | Small | Inexpensive | Present | 3.9 | 0.41 | 2.31 | 112.5 | 82.3 | 73.2 | ◎ |
| Example 3 | Small | Inexpensive | Present | 4.0 | 0.32 | 1.35 | 115.2 | 80.8 | 70.1 | ◎ |
| Example 4 | Small | Inexpensive | Absent | 4.2 | — | 0 | 111.7 | 73.0 | 65.4 | ○ |
| Example 5 | Small | Inexpensive | Absent | 3.8 | — | 0 | 110.9 | 73.4 | 66.2 | ○ |
| Example 6 | Small | Inexpensive | Absent | 3.5 | — | 0 | 111.8 | 73.2 | 65.5 | ○ |
| Example 7 | Small | Inexpensive | Absent | 5.2 | — | 0 | 109.5 | 67.3 | 61.4 | Δ |
| Example 8 | Small | Inexpensive | Absent | 3.6 | — | 0 | 110.3 | 67.8 | 61.5 | Δ |
| Example 9 | Small | Inexpensive | Absent | 4.1 | — | 0 | 97.6 | 55.8 | 57.2 | Δ |
| Example 10 | Small | Slightly expensive | Present | 4.0 | 0.36 | 2.01 | 116.1 | 86.0 | 74.1 | ◎ |
| Example 11 | Small | Slightly expensive | Absent | 3.8 | — | 0 | 114.3 | 71.2 | 62.3 | Δ |
| Example 12 | Small | Slightly expensive | Present | 4.8 | 0.41 | 1.98 | 111.7 | 80.6 | 72.2 | ◎ |
| Example 13 | Small | Slightly expensive | Absent | 4.6 | — | 0 | 110.6 | 68.7 | 62.1 | Δ |

TABLE 2-continued

| Sample No. | Adhesion of volatile matters during calcinating | Raw material cost | Existence of peak (#1) | Half-value width (*) Broad | Half-value width (*) Sharp | Ratio of peak intensity (#2) | Initial charge capacity (mAh/g) Charge | Initial charge capacity (mAh/g) Discharge | Initial Efficiency (%) | Discharge Performance |
|---|---|---|---|---|---|---|---|---|---|---|
| Comparative Example 1 | Large | Expensive | Absent | 3.6 | — | 0 | 98.6 | 53.9 | 54.7 | Δ |
| Comparative Example 2 | Large | Expensive | Absent | 4.0 | — | 0 | 100.1 | 58.6 | 58.5 | Δ |
| Comparative Example 3 | Large | Expensive | Absent | 3.7 | — | 0 | 96.2 | 56.2 | 58.4 | Δ |

Figure 2:
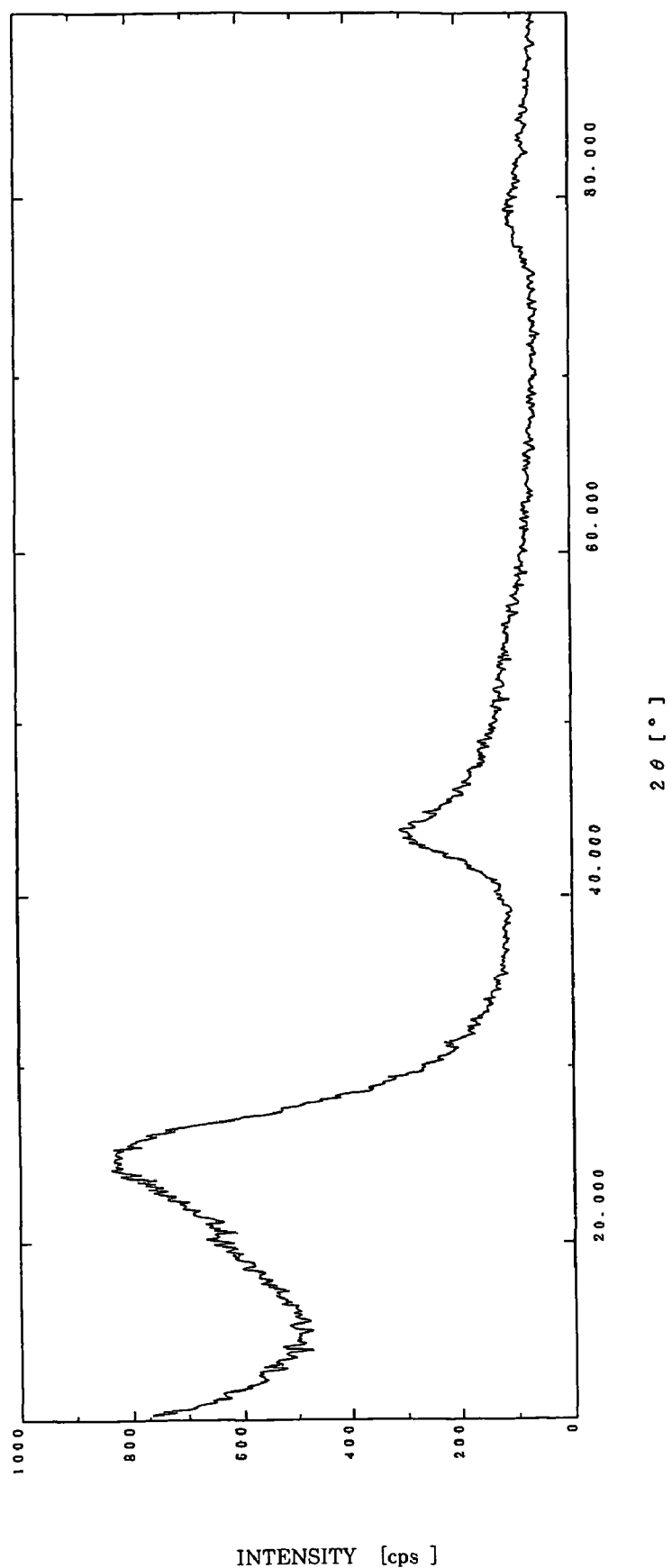
FIG. 2 is an X-ray diffraction diagram of the negative electrode carbon material according to Example 8.

(#1): sharp peak detected at a 2θ of 42 to 44° within a relatively broad peak at a 2θ of 40 to 50°
(#2): A/B ratio of the intensity A of the sharp peak to the intensity B of the broad peak The negative electrode carbon materials for lithium ion secondary batteries of Examples 2, 3, 10 and 12 each had a relatively broad peak at a 2θ of 40 to 50° and a sharp peak at a 2θ of 42 to 44° like Example 1. However, the negative electrode carbon materials for lithium ion secondary batteries of Examples 4 to 9, 11 and 13 each had a relatively broad peak at a 2θ of 40 to 50°, but the half-value width of a peak at a 2θ of 42 to 44° was less than 0.30° and the A/B ratio of the intensity A of this peak to the intensity B of the broad peak was less than 1.2. Therefore, it could not be distinguished from noise (Table 2). An X-ray diffraction diagram of the negative electrode carbon material of Example 8 is shown in FIG. 2.

In Table 1, the negative electrode carbon material for a lithium ion secondary battery of Example 7 which was post-calcinated at 2,700° C. had a graphite structure. The other negative electrode carbon materials for lithium ion secondary batteries had an amorphous-based hard carbon structure.

Thereafter, secondary batteries each including lithium manganate $LiMn_2O_4$ as a positive electrode active substance were manufactured by using those negative electrode carbon materials for lithium ion secondary batteries in accordance with the following procedure.

(Manufacture of Negative Electrode)

Each of the above negative electrode carbon materials for a lithium ion secondary battery and polyvinylidene fluoride (binder) were mixed together uniformly in an N-methylpyrrolidinone solvent in a mass ratio of 91:9. Each of the mixtures was applied to both surfaces of a 14 μm-thick copper foil (assembly of negative electrodes) to a thickness of about 80 μm and dried to manufacture a sheet-like negative electrode. Those negative electrodes were cut into a 1.48 cm×13.0 cm piece, respectively.

(Manufacture of Positive Electrode)

Commercially available lithium manganate $LiMn_2O_4$ (positive electrode active substance, average particle diameter of 10 μm), acetylene black (conducting agent), and polyvinylidene fluoride (binder) were mixed together in N-methylpyrrolidone in a mass ratio of 89:6:5. This mixture was applied to both surfaces of a 15 μm-thick aluminum sheet (assembly of positive electrodes) to a thickness of about 130 μm and dried to manufacture a sheet-like positive electrode. This positive electrode was cut into a 14.3 cm×12.9 cm piece.

(Preparation of Non-Aqueous Electrolyte)

$LiPF_6$ was dissolved in a mixed solvent of ethylene carbonate (EC) and dimethyl carbonate (DMC) in a mass ratio of 50:50 to a concentration of 1 mol/L to prepare a non-aqueous electrolyte.

(Separator)

A commercially available porous stretched polypropylene sheet (UP3025 manufactured by Ube Corporation) was used as a separator. This separator was cut into a 14.8 cm×12.8 cm piece.

(Assembly of Battery)

A laminate composed of the positive electrode, the negative electrode, and the above separator sandwiched between the electrodes was the basic structure of a test battery. The laminate was immersed in the prepared non-aqueous electrolyte for 10 minutes to impregnate the porous stretched polypropylene sheet with the non-aqueous electrolyte to thereby assemble a lithium ion secondary battery. Lead wires were attached to the assemblies of the positive electrode and the negative electrode, respectively, to carry out a charge/discharge cycle test at a constant current at 30° C. In the charge/discharge test, the initial charge/discharge capacity was measured using a charge end voltage of 4.2 V, a discharge end voltage of 2.9V, and a charge/discharge current density of 1 mA/cm². The results are shown in Table 2 together with the results of initial charge/discharge efficiency (initial efficiency=initial discharge capacity/initial charge capacity× 100 (%)). The initial charge/discharge efficiency of the negative electrode carbon material for a lithium ion secondary battery of the present invention was equal to (Δ) or superior (⊚, ○) to that of the prior art product. The charge/discharge performance of the negative electrode carbon material for a lithium ion secondary battery of the present invention which had a relatively broad peak at a 2θ of 40 to 50° and a sharp peak at a 2θ of 42 to 44° was particularly excellent (⊚).

Comparative Examples 1 to 3

A red bran layer portion (L=99.5 to 94%, polishing percentage of 0.5 to 6%) was obtained and a phenolic resin was added to the portion in a mass ratio of 75:25 with reference to JP-A-2001-266,850. Like Example 1, a pelleted raw material was precalcinated in a rotary kiln at 800 to 900° C. for 6 hours in a nitrogen gas atmosphere. This precalcinated product was ground to a ground product having an average particle diameter of 20 to 30 μm, and the ground product was placed in a crucible and post-calcinated at 900 to 1,550° C. for 5 to 10 hours to obtain a negative electrode carbon material for a lithium ion secondary battery (Table 1). A lithium ion secondary battery was assembled in the same manner as in Example 1 to evaluate its charge/discharge performance. The evaluation is shown in Table 2.

Comparative Examples 4 to 6

Red bran (Comparative Example 4) corresponding to the pericarp and the testa, middle-grade white bran (Comparative Example 5), and high-grade white bran (Comparative Example 6) each exists in the step for polishing unpolished rice were calcinated as samples in an electric furnace. About 5° g of each sample was tested in an Ar gas atmosphere at 1,600° C. for 2 hours. In the case of red bran (Comparative Example 4), volatile matters adhered to the top plate in the electric furnace in an amount larger than 10 mass % of the sample and a very bad smell was generated during calcinating. In the case of middle-grade white bran (Comparative Example 5) and high-grade white bran (Comparative Example 6), the adhesion of volatile matters to the top plate in the electric furnace was less than 2 mass % of the sample. In Comparative Example 4, it took 5 times or more of time and labor to obtain the same amount of a calcinated material as the middle-grade white bran (Comparative Example 5), including low recovery and the time of maintenance of the electric furnace.

What is claimed is:

1. A negative electrode carbon material for a lithium ion secondary battery obtained by calcinating a rice starch portion obtained by removing a pericarp and a testa from unpolished rice,
wherein the negative electrode carbon material obtained by calcinating the rice starch portion has a first peak at a 2θ of 40 to 50° and a second peak, which is sharper than the first peak, at a 2θ of 42 to 44° in its powder X-ray (CuKα) diffraction.

2. A negative electrode carbon material for a lithium ion secondary battery according to claim 1, wherein the rice starch portion is any one of middle-grade white bran and high-grade white bran each collected when unpolished rice is polished.

3. A negative electrode carbon material for a lithium ion secondary battery according to claim 1, wherein an A/B ratio of an intensity A of the second peak at a 2θ of 42 to 44° to an intensity B of the first peak at a 2θ of 40 to 50° is 1.2 or more.

4. A negative electrode carbon material for a lithium ion secondary battery according to claim 1, wherein a half-value width of the first peak at a 2θ of 40 to 50° is 3.5 to 5.5° and a half-value width of the second peak at a 2θ of 42 to 44° is 0.30 to 0.45°.

5. A negative electrode carbon material for a lithium ion secondary battery according to claim 1, wherein the rice starch portion is calcinated at 1,100 to 1,400° C. for 0.5 to 50 hours.

6. A method for manufacturing a negative electrode carbon material for a lithium ion secondary battery, comprising: a first step for obtaining a rice starch portion by removing the pericarp and the testa from unpolished rice; and a second step for calcinating the rice starch portion.

7. A method for manufacturing a negative electrode carbon material for a lithium ion secondary battery according to claim 6, wherein the first step includes a sub-step for removing an aleurone layer after the pericarp and the tests are removed from the unpolished rice.

8. A method for manufacturing a negative electrode carbon material for a lithium ion secondary battery according to claim 7, wherein; the first step is a step for acquiring a rice starch portion corresponding to middle-grade white bran and/or high-grade white bran collected when unpolished rice is polished; and the second step is a step for calcinating the rice starch portion corresponding to the middle-grade white bran and/or the high-grade white bran.

9. A method for manufacturing a negative electrode carbon material for a lithium ion secondary battery according to claim 7, wherein the first step is acquiring a rice starch portion having a polishing percentage of 7 to 65%.

10. A method for manufacturing a negative electrode carbon material for a lithium ion secondary battery according to claim 7, wherein the second step comprises: a sub-step for precalcinating the rice starch portion to thereby obtain a precalcinated product; a sub-step for grinding the precalcinated product into a ground product; and a sub-step for post-calcinating the ground product at a temperature higher than a temperature of the precalcinating step.

11. A method for manufacturing a negative electrode carbon material for a lithium ion secondary battery according to claim 6, wherein; the first step is a step for acquiring a rice starch portion corresponding to middle-grade white bran and/or high-grade white bran collected when unpolished rice is polished; and the second step is a step for calcinating the rice starch portion corresponding to the middle-grade white bran and/or the high-grade white bran.

12. A method for manufacturing a negative electrode carbon material for a lithium ion secondary battery according to claim 11, wherein the first step is acquiring a rice starch portion having a polishing percentage of 7 to 65%.

13. A method for manufacturing a negative electrode carbon material for a lithium ion secondary battery according to claim 11, wherein the second step comprises: a sub-step for precalcinating the rice starch portion to thereby obtain a precalcinated product; a sub-step for grinding the precalcinated product into a ground product; and a sub-step for post-calcinating the ground product at a temperature higher than a temperature of the precalcinating step.

14. A method for manufacturing a negative electrode carbon material for a lithium ion secondary battery according to claim 6, wherein the first step is acquiring a rice starch portion having a polishing percentage of 7 to 65%.

15. A method for manufacturing a negative electrode carbon material for a lithium ion secondary battery according to claim 14, wherein the second step comprises: a sub-step for precalcinating the rice starch portion to thereby obtain a precalcinated product; a sub-step for grinding the precalcinated product into a ground product; and a sub-step for post-calcinating the ground product at a temperature higher than a temperature of the precalcinating step.

16. A method for manufacturing a negative electrode carbon material for a lithium ion secondary battery according to claim 6, wherein the second step comprises: a sub-step for precalcinating the rice starch portion to thereby obtain a precalcinated product; a sub-step for grinding the precalcinated product into a ground product; and a sub-step for post-calcinating the ground product at a temperature higher than a temperature of the precalcinating step.

17. A method for manufacturing a negative electrode carbon material for a lithium ion secondary battery according to claim 16, wherein: the precalcinating sub-step is a sub-step for calcinating the rice starch portion at 500 to 1,000° C. for 0.5 to 10 hours; and the post-calcinating sub-step is a sub-step for calcinating the ground product at 700 to 1,600° C. for 0.5 to 50 hours.

* * * * *